United States Patent

[11] 3,620,519

[72] Inventor Frank Forbes
 Bethel Borough, Pa.
[21] Appl. No. 879,491
[22] Filed Nov. 24, 1969
[45] Patented Nov. 16, 1971
[73] Assignee Dravo Corporation
 Pittsburgh, Pa.

[54] TRAVELING GRATE APPARATUS AND METHOD
 16 Claims, 4 Drawing Figs.
[52] U.S. Cl. ................................................. 263/28,
 266/21
[51] Int. Cl. ..................................................... F27b 9/00
[50] Field of Search ........................................... 263/28;
 266/21; 75/1

[56] References Cited
 UNITED STATES PATENTS
 1,089,868 3/1914 Ramen ........................ 263/28
 2,945,755 7/1960 Schulz ........................ 263/28

*Primary Examiner*—John J. Camby
*Attorney*—Parmelee, Utzler & Welsh

ABSTRACT: There is disclosed a method and apparatus wherein a traveling grate carries a charge of pellets or likeformed ore bodies through a furnace providing a downdraft heat-indurating zone and subsequently through an updraft cooling zone. A cover or secondary tunnel is provided inside the furnace over the grate between the indurating and cooling zones, and there is a passage inside the furnace above the secondary tunnel and the furnace roof. Ambient air, forced upward through the grate in the cooling zone, becomes highly heated by contact with the hot ore bodies, and burners over the cooling zone or in said passage generate flames with the heated air supporting combustion. The air and products of combustion flow out the passage into the indurating zone where they travel down through the grate to indurate the bed of ore bodies on the grate. Oil burners may be used because the the ore bodies on top of the bed in the indurating zone are substantially shadowed from the direct radiant heat of the flames and therefore prevented from fusing, while the secondary tunnel and the updraft of air in the cooling zone protect said top layer from being heated to fusing temperature. The operation also provides more uniform heating of the ore bodies than the usual practice where there are a succession of individual burners in the heat-indurating zone.

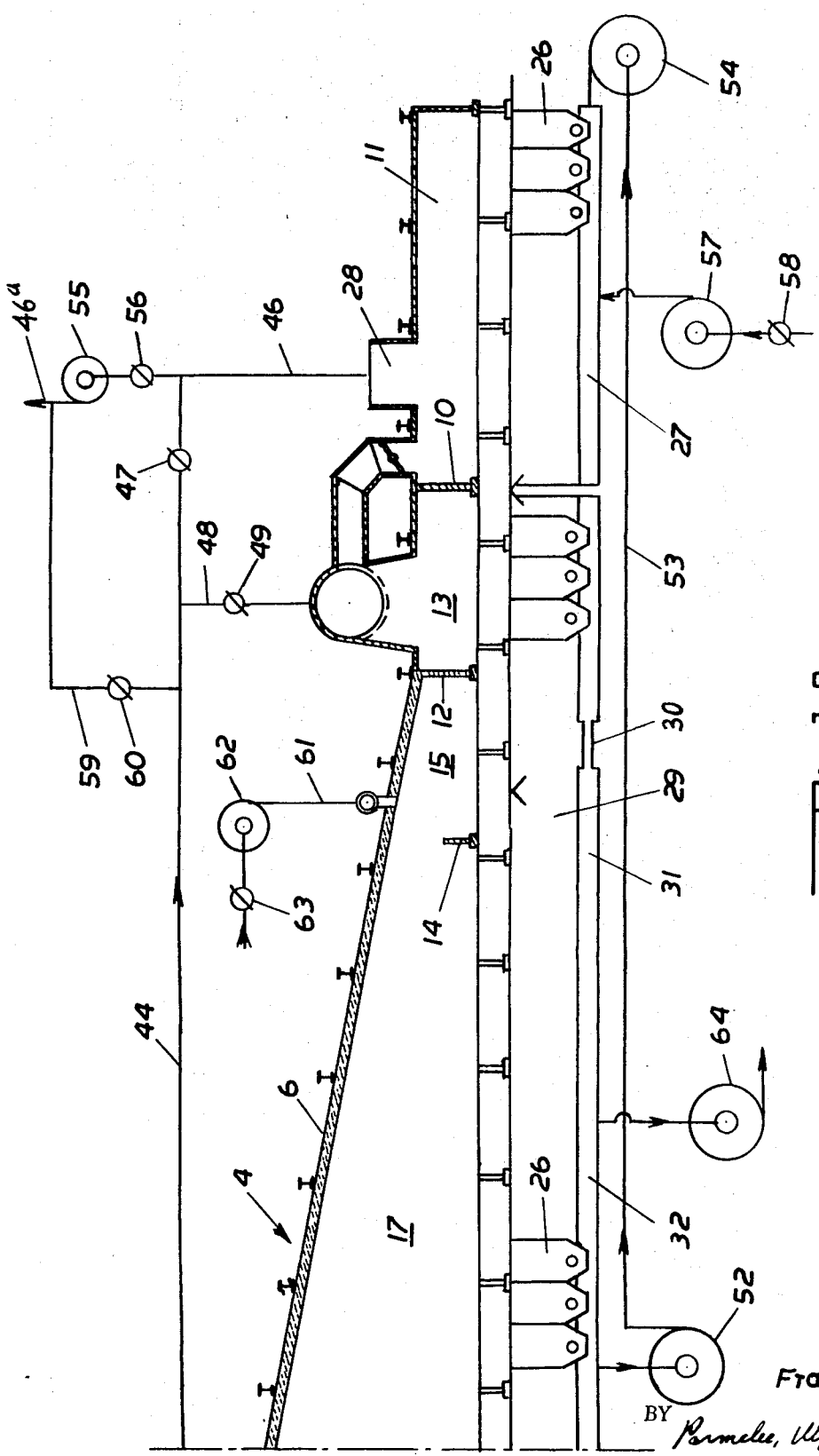

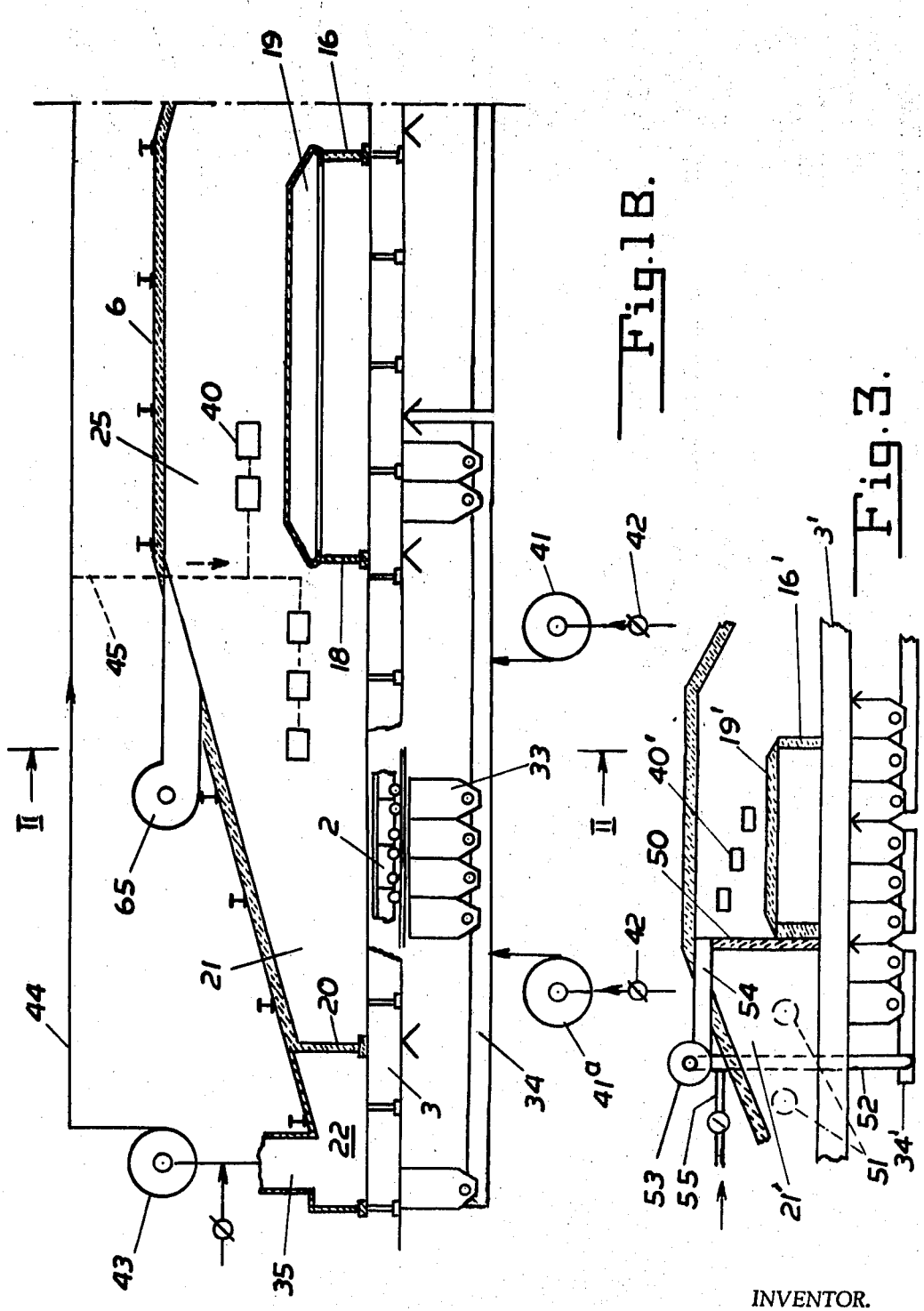

TRAVELING GRATE APPARATUS AND METHOD

FIELD OF THE INVENTION

This invention relates to the heat induration of formed bodies of ore such as pellets, and is for an improved traveling grate apparatus and method for this purpose.

BACKGROUND OF THE INVENTION

It is common practice, particularly in the iron and steel industry, to prepare ore for reduction to metal by forming beneficiated ore fines into pellets. The so-called green pellets thus formed are then heat hardened so that they will withstand breakage in shipment or storage and crushing in the stock column of a blast furnace. While the pellets are sometimes fired in a shaft furnace, the more widely used practice is to arrange them in a bed of generally uniform depth on a traveling grate machine comprising a continuous succession of pallets that carry the pellets under a hood and over a succession of wind boxes through drying, preheating, firing, and cooling zones. Such an apparatus is disclosed in U.S. Pat. to J. A. Anthes, et al., No. 3,172,754, issued to our assignee, Dravo Corporation.

In all such operations, heat must be supplied from fuel burners and the temperature required for induration is usually of the order of 2,300° to 2,500° F. The effective recuperation of heat from the pellets after they have been fired is important to the economy of the operation.

Heretofore it has been considered necessary to locate the fuel burners at somewhat precise spaced locations over the bed of pellets along its path of travel in the firing or indurating zone, with a succession of individual wind boxes under the grate so that hot combustion gases could be drawn from the burners down through the bed of pellets into these wind boxes. Preheated air derived from the cooling of the pellets was supplied to the individual burners from the central longitudinally extending conduit through downcomer pipes at each side of the traveling grate, with dampers to control the air flow to each burner. Each wind box also usually had dampers to regulate the suction in each wind box. All of this was considered necessary to get closely regulated temperature control along the traveling grate from one point to another, and this was thought to be necessary for satisfactory results. Notwithstanding the careful provision for control, a malfunctioning of one of the several burners could result in the pellets in a certain portion of the bed being below standard.

It was found that where oil was the most economically available fuel for the burners, the radiant heat from the luminous flame caused an overheating of the pellets at the top of the bed where they were directly exposed of the flame. This resulted in the fusing together of the pellets in the top layer, interfering with the flow of air or gases through the bed either for firing underlying pellets or the uniform flow of cooling air through the bed, as well as requiring that the fused masses be broken up when they were discharged from the traveling grate. To overcome this, a special laterally extending refractory tunnel was built out from each burner port in the sidewall of the hood with the burner located at the outer end of the tunnel, the tunnel being of such length that most of the combustion space was provided within the tunnel and the pellets would thereby be shielded from the radiant heat. This increases the initial cost of the apparatus and an added upkeep expense, since the refractory burner tunnels require routine replacement or repair because of the highly destructive thermal conditions to which they are subjected.

I have determined that entirely satisfactory results can be secured without the close control heretofore provided in successive areas along the grate, and that the burners may be grouped in an area in the hood over the traveling grate where the radiant heat is ineffective to fuse the top layer of pellets, but is nevertheless effectively utilized. The construction of the entire apparatus is simplified through the use of this invention because it eliminates much of the duct system heretofore required; the elimination of the many downcomers for hot gases heretofore required, and the replacement, if desired, of a succession of short wind boxes with a few relatively long wind box areas or chambers, along with the elimination of the laterally extending burner tunnels heretofore used with oil-fired burners.

SUMMARY OF THE PRESENT INVENTION

According to the preferred embodiment of this invention there is a traveling grate machine having a continuous succession of pallets within a tunnellike furnace enclosure. The green pellets are loaded as usual, onto the traveling grate at one end, which may be termed the rear of loading end, and carried through the refractory-lined enclosure, being carried in succession through drying, preheating, firing and after-firing zones, and then through a cooling zone to the discharge or forward end, as is customary, but the tunnel structure and burner arrangement is unique. There is a secondary enclosure or tunnel over the grate inside of the first tunnel over what may be termed the afterburning section in the transition area between the indurating zone and the cooling zone with a passageway in the outer or principal enclosure or tunnel over top of the secondary tunnel through which cooling air, blown updraft through the pellets in the cooling zone, may flow rearwardly over the secondary tunnel into the firing zone. The cooling air, blowing upward through the grates and overlying bed of hot pallets, extracts heat therefrom and is quite hot when it emerges from the bed to travel through the passage over the secondary tunnel to the firing zone.

Accordingly to this invention, the burners are located entirely forwardly of the firing zone, either above the secondary tunnel, or in the cooling area, or both, where their flames are directed into this stream of the now hot cooling air. This heated air provides secondary combustion air for the burning fuel and the hot combustion gases mingle with and raise the temperature of the stream of air so that the combined gases reach a temperature required for indurating the pellets. The secondary tunnel shades the pellets in the top of the bed from direct exposure to the radiant heat of the luminous flame generated by burners above the secondary tunnel. Where the burners are located forward of the secondary tunnel above the bed of pellets in the cooling zone, the pellets are exposed to the radiant heat, but they do not fuse or overheat because they are in the upwardly flowing draft of cooling air. With either location of the burners, the radiant heat which impinges on exposed surfaces is carried away from said surfaces by the air or mixture of air and gases as they flow out of the cooling zone rearwardly to the indurating zone.

In the indurating zone rearwardly of the secondary tunnel the gases and air are drawn down through the bed of pellets into one or more wind box means under the grate. Since the mixture of combustion gases and air is uniform over the grate in the indurating zone, localized zones under each burner, as in conventional machines, are eliminated, and the pressure along the indurating zone is equalized by a tunnel roof sloping downwardly and rearwardly from said passage, thereby decreasing the section of the tunnel as the length of travel of the gases over the bed increases. In the drawing showing a preferred embodiment of the invention:

FIG. 1A is a somewhat schematic longitudinal section through the rear or entering end portion of a traveling grate machine embodying the invention, and with the duct system being diagrammatically indicated;

FIG. 1B is a similar view of the remaining portion of the apparatus, the total length being such that a single view of the entire apparatus requires the parts to be shown too small for clarity;

FIG. 3 is a fragmentary view of a portion of the apparatus shown in FIG. 1B with a modification.

Figure 2:
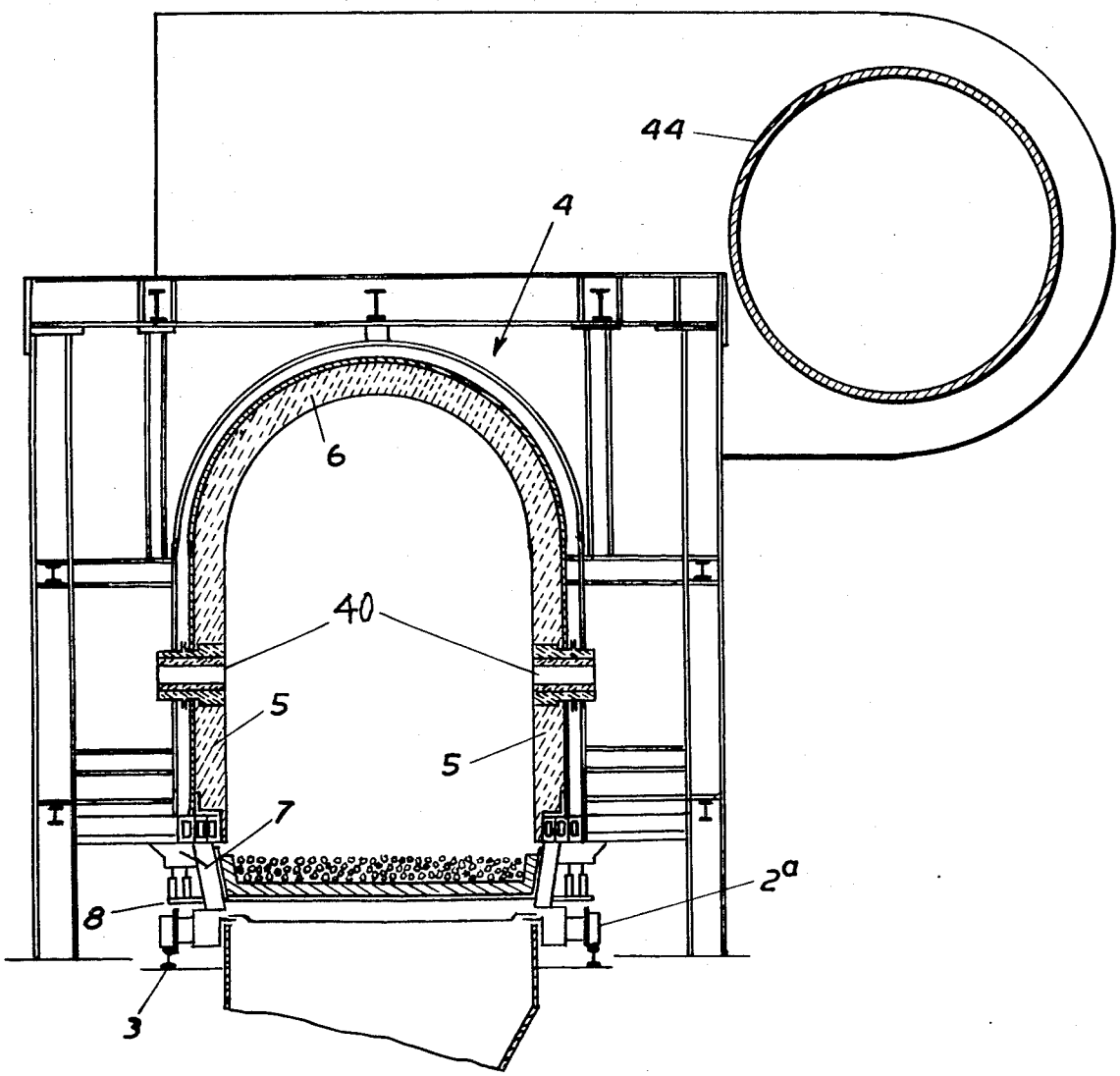
FIG. 2 is a transverse vertical section in substantially the plane of line II—II OF FIG. 1, but on larger scale.

In the drawings, the entering or rear end of the furnace is at the right. Only a fragment of the continuous traveling grate 2, comprised of abutting pallets, is shown, and 3 designates the horizontal trackway along which it travels. The return reach of the traveling grate is not shown, nor are the sprockets at each end of the machine with the drive at the entering end shown, these all being well known in the art.

The furnace itself comprises a hood or enclosure in the form of a tunnel, designated generally as 4, and as shown in FIG. 2, has parallel sidewalls 5 and a transversely arched top 6. As shown in this figure, the sidewalls extend down to and overhang the ends of the pallets. There is the usual sliding seal at 7 between the pallets and the hood or tunnel structure, such for example, as that shown in U.S. Pat. No. 3,172,936 granted Mar. 9, 1965 to my assignee. The wheels at the opposite ends of the pallets are designated 2a. There is a sliding seal 8 between the pallets and the tops of the wind boxes, these also being of a known construction. While the tunnel here shown is an elongated structure, the invention is applicable also to circular traveling grate furnaces.

Within the hood or tunnel 4 there is a transverse partition 10 spaced some distance in from the entrance end that extends from the roof down to the level of the tops of the traveling grate in the usual manner. There is a chamber 11 above the traveling grate between the entrance and this partition defining an updraft drying zone. There is a second such partition 12 spaced from partition 10, with a chamber 13 defining a downdraft drying zone. Further along there is a partial partition 14 extending upwardly from the traveling grate, but terminating below the roof, and the space 15 between partitions 12 and 14 is a preheating zone.

From partition 12 the roof slopes upwardly and forwardly to a location approximately above another partial partition 16, and the space 17 above the grate is the firing or indurating zone. There is another partial partition 18 forwardly of 16, and a cover or roof 19 spaced below the main roof extends from the top of partition 16 to the top of the partition 18, forming what I term a secondary or inner tunnel. From the forward end of the inner tunnel, defined by partial partition 18 to the discharge end of the tunnel 4 is a cooling zone with a full partition 20 dividing it into two separate cooling areas 21 and 22. From about the plane of the partition 18 and past the partition 20 the roof slopes downwardly and forwardly. There is an open fore-and-aft passage 25 above the secondary tunnel and below the roof along the area of its maximum height.

I have indicated schematically and only fragmentarily, the usual continuous succession of wind box means under the grate coextensive with the length of the enclosure, but in place of the usual wind boxes, there may be longer wind box enclosures. The dead plate areas where there is a change between updraft and downdraft, or where there may be a change of pressure, are indicated in the drawing by the inverted V-formations, since the scale of the drawing is much too small to show such well-known details. The wind box means under the updraft drying zone 11 is designated 26. There is a manifold 27 alongside this area, as is usual in the art, but for the purpose of illustration it is schematically shown partially below the wind boxes.

Under zone 13 there is a wind box area 29, and this area continues to a point intermediate the length of the secondary tunnel, providing wind boxes under areas 15 and 17, as well as 13, and also part way under the secondary tunnel. There is a manifold along this series of wind boxes that may be completely or partially blocked at 30, forming sections 31 and 32. There is another wind box area 33 extending under a portion of the secondary tunnel and under the cooling areas 21–22 to the discharge end of the main tunnel or enclosure. There is a manifold 34 for this area or series of wind boxes. There is an air outlet 35 from the top of cooling zone 21.

The luminous flame fuel burners, such as oil burners, are located entirely forward of indurating zone 17, either in the space 25 above the secondary tunnel, or over the cooling zone, or both. They are located in the sidewalls and project their flame crosswise. They are indicated schematically by the burner ports 40 and may be in both sidewalls, as shown in FIG. 2. With the burners so located, the pellets in the firing or indurating zone are not exposed to direct radiation of heat from the burning gases, but air, forced upwardly through the bed of previously fired pellets in zone 21, is highly heated and provides secondary combustion air for the fuel as it travels through the flame area, and in so doing mixes with the combustion gases. The combustion gas and air mixture flows rearwardly through passage 25 over the secondary tunnel and then into the chamber 17, and then down through the pellets in zones 17 and 15. While the pellets at the top of the bed in the cooling zone may be exposed directly to radiated heat, the constant flow of cooling air upwardly therethrough prevents them from fusing, and they pass relatively quickly into the cooling zone forwardly of the burners where the radiant heat is less intense.

Of course pellets under the cover or hood 19 forming the secondary tunnel are shielded by this hood from the radiant heat sufficiently to prevent fusing thereof. In the forward portion of the secondary tunnel cooling air is forced upwardly through the pellets to initiate the cooling phase of the operation. This initial flow of the cooling air, after being heated by passing upwardly through the bed in the forward end of the secondary tunnel, flows down through the pellets at the entering end of the secondary tunnel. This provides the afterburning section where any still unburned fuel is burned, or if the ore is being converted from magnetite to hematite, oxidation is completed and the induration of the pellets completed. Since heat induration is completed and cooling begins under the secondary tunnel, this may be referred to as a transition zone. This movement of air under the hood 19 keep that hood itself from becoming so hot as to radiate heat to the pellets under it to the fusing temperature.

In the overall operation of the traveling grate as here disclosed, a bed of green pellets is loaded at the rear or loading end onto the continuously traveling grate to a depth about level with the sides of the pallets and is carried forward through the successive zones to the discharge end. Ambient air is supplied to manifold 34 by blowers 41 and 41a, each with a damper 42. Part of this air flows up through the bed of pellets in the zone 22 where the pellets are coolest. The air becomes heated by contact with the now partially cooled pellets and is drawn from outlet 35 by a fan 43 and discharged into duct 44. As indicated by broken lines 45, some of this air is supplied to the burners 40 as primary air. Line 44 continues over to line 46 which is a flue duct for exhausting air and gases from the updraft drying zone. There is a damper 47 in line 44 in advance of its juncture with duct 46. A second branch pipe 48 ahead of damper 47 leads to the downdraft drying zone 13. There is a damper 49 in this duct.

Other air from blowers 41 and 41a is forced up through the bed of pellets in the cooling zone 21 where the pellets are more highly heated than in zone 22, and as before explained, this highly heated air provides secondary combustion air for the flames generated by the burners and travels rearwardly through internal passage 25 and discharges into area 17 where it is forced downwardly through the traveling grate with its bed of pellets to indurate them, usually at a temperature between 2,300° and 2,500° F. If the pellets are formed of magnetite ore, sufficient air is supplied to oxidize the ore to hematite, and if the pellets contain fuel, to burn the fuel. The induration progresses downwardly through the bed of pellets so that the pellets themselves are protected from the high heat through a considerable part of their travel toward the cooling zone.

The remaining ambient air supplied by blowers 41 and 41a is forced up through the pellets at the forward end portion of the secondary tunnel, that is rearwardly of partition 18, to initiate the cooling state and first of all contact the highly heated metal pellets to cool them. This air is then forced downward in the rear portion of the secondary tunnel, forwardly of partition 16 to complete the induration in the afterburner zone, as described.

The air and gases from the afterburning section and the forward portion of the zone 17 are the hottest, since in these areas indurating heat has penetrated through or substantially through the bed of pellets. The air and gases from these areas are discharged into manifold 32. They are drawn from this manifold by fan 52 through duct 53, and the blower 54 into the manifold 27 to be forced up through the green pellets in the updraft drying zone, and then discharged to the flue outlet duct 46. There may be an exhaust fan 55 in flue duct 46, and a damper 56 is indicated ahead of this fan. Provision may be made for supplying ambient air to manifold 27 to temper the hot gases. This is indicated by blower 47 with damper 58. There is shown a bypass duct 59 with a damper 60 therein through which air from duct 44 may be diverted to the flue duct 46a on the discharge side of fan 55.

Some of the highly heated air and combustion gases will flow over the partial partition 14 into the preheating zone. This zone may be controllably supplied with ambient air through duct 61, blower 62 and damper 63 to reduce the temperature of the gases in the preheating zone. The gases and air in the preheating zone and the first portion of the firing zone, and also in the downdraft drying zone 13 are drawn through the bed of pellets by suction fan 64, and since these gases are relatively cool, they may be discharged along with air and gases from duct 46a to the stack (not shown).

The external duct and blower arrangement to provide the desired sequence of updraft drying, downdraft drying, and the recuperation of heat is significant to this invention only to show a complete apparatus and also to show the adaptability of the present invention to present practice insofar as the sequence of steps is concerned. The present invention is important in the provision of what I term the inner or secondary tunnel between the firing and the cooling zones with the burners all located in positions forward of the indurating zone where the pellets are either shaded from the radiant flame, or if exposed, the distance between the flames and the area of impingement of the heat on the pellets is so great that the radiant heat is of no significant consequence. By carrying the hot air and combustion gases rearwardly through passage 25 to the firing zone and preheating zone, the usual external duct work with downcomer pipes branching out of it to carry air forwardly to burners in the indurating zone as is now commonly done, is eliminated. Since there is one large body of uniformly hot gases in the chamber 17, instead of a succession of individual burners along the firing zone, as heretofore generally provided, the close control of the flow of gases into the wind boxes at different locations is unnecessary, and there is less likelihood of a variation in the finished pellets because of a misfiring, for example, of one burner, particularly since it is easy to monitor the temperature in the chamber 17. Should it be necessary to supply additional oxygen or reduce temperature where the hardening of the pellets is effected with the exothermic oxidation of magnetite to hematite, for example, or where the pellets are combined with fuel, a blower 65 may be provided on top of the furnace in a position to supply a controlled volume of air into the passage 25 to mingle with the turbulent flow of gases through this passageway. The downward slope of the roof toward the rear from the high portion over the secondary tunnel 19 serves to equalize the flow of gasses toward the rear or entering end, the decrease in the space under the roof compensating largely for the loss in volume of air and gases due to the length of the indurating zone and the removal of gases down through the bed along this long stretch, and it assures an adequate supply of hot gases over the partial partition 14 for the preheating zone. In other words, the slope of the roof over the indurating and preheating zones provides a chamber 17 of rearwardly diminishing cross-sectional area for maintenance of more uniform pressure conditions along this length of the grate. Such condition is also desirable over the cooling zone to provide a more evenly distributed upflow of cooling air through the pellets.

While the invention is particularly applicable to traveling grate apparatus with updraft cooling, it may be adapted to downdraft cooling as indicated schematically in FIG. 3. In this figure, 3' indicates the traveling grate. There is a secondary or inner tunnel comprising partitions 16' and 18' and cover 19'. The luminous flame burner ports 40' are all located inside the main tunnel above the secondary tunnel. There is a partition 50 extending up from the forward end of the secondary tunnel to the roof. The cooling zone 21' is supplied with ambient air through ports 51. The cooling air is drawn downwardly through the grate into wind boxes 31'. From there it enters manifold 34' and is drawn through an external duct 52 by fan 53 and discharged into duct 54 opening into the area 25' to supply combustion air to the burners 40'. External air is supplied to the fan through damper-controlled duct 55 to protect the fan from excessively high temperatures. The air flow under the secondary tunnel may be the same as in FIG. 2B, with upflow from the wind boxes under the forward end of the secondary tunnel and reverse flow through the rear portion or afterburner zone. Forwardly of the secondary tunnel the arrangement is the same as in FIG. 1A.

The secondary tunnel, as before, shields the pellets in the transition zone from direct radiation and the burners are in a combustion area above the secondary tunnel and below the roof. The combustion gases and unburned air flow as a stream into the indurating zone, as described in the preferred embodiment, getting away from the problem of control that exists with individual burners positioned along the grate, with the elimination of the many downcomer ducts as previously required.

Also, about the same arrangement shown in FIG. 3 may be used with updraft cooling, in which case pressure air is supplied to the wind boxes under the cooling zone and the duct 52 then terminates at one or more of the outlet ports 51 so that the fan 53 maintains a reduced pressure in zone 21'. The air removed by the fan is mixed with ambient air through duct 55. With this arrangement the operation is much like FIG. 1, except the seals for the traveling grate with the hood operate at a lower pressure, but the hot gases must be cooled by ambient air to protect blower 53, so that the air supplied to the burners 40' is not as hot, that is, the heat is less effectively recuperated. However, as in all other cases, the comptacts on the traveling grate are shielded from direct radiant heat from the luminous flames.

While I have referred particularly to pellets, the invention is applicable not only to pellets, but to other preformed ore bodies that are to be heat hardened on a traveling grate.

I claim:

1. The method of heat hardening formed bodies of ore on a traveling grate on which a bed of said ore bodies is supported and carried by the grate through an enclosure which provides an elongated heat-indurating zone with a chamber above the grate in said zone and which is followed first by a separately confined transition zone within said enclosure and thereafter by an elongated cooling zone where ambient air is forced through the bed of indurated pellets to cool them, comprising the steps of forcing the ambient cooling air after it has been heated by passing through the bed of hot ore bodies past a group of luminous flame burners for which it provides combustion air, shielding the bed of ore bodies on the grate in the indurating zone from overexposure to direct radiation of heat from said flames and while the resulting products of combustion and unconsumed air flow into and fill the chamber above the grate in the indurating zone and are then drawn downwardly from said chamber through the bed of ore bodies on the grate in the indurating zone while also circulating other ambient air first upwardly through the grate in said transition zone and then downwardly through the grate in said transition zone, the upflow being through the end of the transition zone which is nearest the cooling zone and the downflow at the end nearest the indurating zone.

2. Apparatus for heat hardening pellets and like preformed ore bodies comprising:
   a. a tunnellike enclosure and a continuous traveling grate movable forwardly through the enclosure for supporting and conveying a bed of said preformed ore bodies through said enclosure, b. transverse partitions in said enclosure above the grate dividing the interior of the enclosure into a downdraft indurating zone followed in the direction of travel of the grate by an updraft cooling zone, c. means for forcing air upwardly through the bed of ore bodies on the grate in the cooling zone, d. means for drawing hot gases downwardly through the bed of ore bodies on the grate in the downdraft firing zone, e. means comprising a horizontal refractory wall within the enclosure forming a confined transition zone below the horizontal wall between the cooling zone and the indurating zone at a level below said horizontal wall and above the bed of ore bodies on the grate, there being provided also a passage above said horizontal wall leading from the cooling zone to the chamber above the indurating zone, f. fuel burners along the enclosure arranged to generate flames in the air that has been heated in passing upwardly through the ore bodies in the cooling zone and form a mixture of hot combustion gases and air and discharge the same into said passage from which they flow into the indurating zone, g. means for inducing a flow of said mixture downwardly through the traveling grate and bed of ore bodies supported thereon in the indurating zone, h. the said horizontal wall being positioned to form a shield for protecting the bed of ore bodies on the grate in the indurating zone from excessive radiant heat from the flames generated by said burners and provide an air space above the bed of ore bodies on the grate and below the horizontal wall, and, i. means for circulating air through the bed of ore bodies on the grate in said transition zone and through said air-circulating space under the horizontal wall.

3. The apparatus defined in claim 2 wherein at least some of the burners are in the cooling zone above the grate.

4. The apparatus defined in claim 2 wherein at least some of the burners are located along said passage between the cooling zone and the indurating zone.

5. The apparatus defined in claim 2 wherein there are fuel burners in the cooling zone above the grate and additional burners along said passage.

6. Apparatus for heat hardening pellets and like preformed ore bodies comprising:

a. a tunnellike enclosure having a roof and sidewalls and a traveling grate arranged to support and convey a bed of preformed ore bodies to be heat hardened through the enclosure, b. transverse partitions in said enclosure arranged to divide the space in the tunnel above the level of the grate into a plurality of chambers, and wind box areas under the grate, the partitions above the grate and the wind box areas below comprising a succession of zones, one of which is a downdraft indurating zone and another of which is an updraft cooling zone, c. there being two transverse partitions between the indurating zone and the cooling zone with a cover spaced below the enclosure spanning the distance between them and providing a passageway above said cover and below the roof of the enclosure that extends between the chamber in the cooling zone and the chamber in the induration zone, d. means for forcing air upwardly through the grate in the cooling zone and for inducing a flow of air and gases downwardly through the grate in the indurating zone with a flow of air through said passage from the chamber above the grate in the cooling zone to the chamber above the grate in the indurating zone, and e. fuel burners arranged to effect the burning of fuel in the air flowing rearwardly through said passage into the chamber above the indurating zone, said burners being located forwardly of the discharge end of said passage.

7. The apparatus defined in claim 6 wherein said burners are oil burners and the bed of ore bodies on the grate in advance of the cooling zone are shielded from direct radiation of heat from the burners by said cover over the said two partitions between the indurating and cooling zones and by the location of said burners with respect to the passageway rearwardly from its discharge end.

8. Traveling grate apparatus for heat hardening pellets and like-formed bodies of ore comprising:

a. a traveling grate for supporting and carrying a bed of formed ore bodies, b. a furnace enclosure through which the grate travels, c. transverse partitions in said enclosure above the level of the top of the traveling grate dividing the space within the enclosure into chambers, d. wind box means under the traveling grate arranged into divisions, said partitions and chambers providing a succession of zones, one of which comprises a downdraft indurating zone where the bed of ore bodies on the traveling grate are raised to an indurating temperature by the passage of hot gasses from said chamber downwardly through the grate and bed of ore bodies into the wind box means thereneath and another zone forwardly with respect to the travel of the grate comprises an updraft cooling zone wherein ambient air is forced upwardly from the wind box means therein through the grate and the bed of pellets thereon into the chamber above it to cool the ore bodies, e. means in the furnace enclosure covering the traveling grate between the indurating zone and the cooling zone and forming a passage thereover within the furnace enclosure for the flow of air from the chamber of said updraft cooling zone into the chamber of said downdraft indurating zone, f. means for forcing cooling air upwardly through the grate and the bed of ore bodies in the updraft cooling zone and through said passage into the chamber of the downdraft indurating zone and for inducing a flow of gases from said last-named chamber downwardly through the grate and bed of ore bodies in the heat indurating zone, and g. fuel burners arranged to project flames into the air flowing from the updraft cooling zone to the indurating zone, said air providing combusting air for the burners and whereby the mixture of air and combustion gases is raised to the required temperature to effect the induration of the ore bodies, the burners being located ahead of the said passage where it opens into the chamber of the heat indurating zone, whereby the ore bodies in the bed in the heat indurating zone are not exposed to sufficient radiant heat from the flames to fuse the ore bodies in the top of the bed.

9. Traveling grate apparatus as defined in claim 8 wherein said means which covers the ore bodies between the cooling and indurating zones comprises a radiation shield to protect ore bodies in transition between the indurating and cooling zones from excessive radiant heat from the flames.

10. Traveling grate apparatus as defined in claim 8 wherein said means which covers the grate and bed of pellets in transition between the indurating zone and the cooling zone is a secondary tunnel with a transverse partition at each end and a space thereneath above the grate, and wherein means are provided to effect an upward flow of ambient air through the grate and the bed of ore bodies thereon into the secondary tunnel at its forward end and to effect a reverse flow of air from the secondary tunnel down though the grate and bed of the ore bodies at the rear of the secondary tunnel.

11. Traveling grate apparatus as defined in claim 8 in which the transverse cross-sectional area of the chamber in the indurating zone decreases gradually from said passage rearwardly to the opposite end of said chamber.

12. Traveling grate apparatus as defined in claim 8 in which one of said partitions is a partial partition at the rear end of the heat indurating zone over the top of which hot air and gases will flow from the chamber of the indurating zone to provide a preheating zone through which the grate travels before it passes into the indurating zone, and means for drawing gases downwardly through the grate and bed of ore bodies in the preheating zone.

13. Traveling grate apparatus as defined in claim 12 in which the furnace enclosure has a roof which slopes downwardly and rearwardly from said passage to a point rearward of said partial partition and there is a full partition extending from the level of the grate to the roof spaced rearwardly from said partial partition.

14. Traveling grate apparatus as defined in claim 12 wherein means is provided for introducing ambient air into the preheating zone above the grate to reduce the temperature of the gases and air in the preheating zone.

15. Traveling grate apparatus comprising:
a. a main tunnel enclosure with a roof and sidewalls and a continuous traveling grate movable forwardly through the enclosure for supporting and conveying a bed of preformed ore bodies through the enclosure from a charging end to a discharge end,
b. transverse partitions in said enclosure dividing the interior into a drying and preheating zone, and a cooling zone and with a transition zone between the downdraft indurating zone and the cooling zone,
c. means over the transition zone spaced above the grate and spaced below the roof of the main tunnel providing a secondary tunnel entirely within the main tunnel,
d. luminous fuel burners in the space above the secondary tunnel and below the roof of the main tunnel,
e. means for circulating air through the ore bodies on the traveling grate in the cooling zone and supplying it to said space where it supplies combustion air for the fuel burners, said space opening rearwardly into the downdraft indurating zone, whereby the hot combustion gases contact the ore bodies while those ore bodies on the surface of the bed on the traveling grate are shielded by the secondary tunnel means from direct luminous flame radiation sufficient to fuse them.

16. Traveling grate apparatus as defined in claim 15 wherein a circulation of air through the ore bodies is provided in the transition zone within said secondary tunnel.

* * * * *